US010432535B2

(12) United States Patent
Nandy et al.

(10) Patent No.: US 10,432,535 B2
(45) Date of Patent: Oct. 1, 2019

(54) PERFORMING A SPECIFIC ACTION ON A NETWORK PACKET IDENTIFIED AS A MESSAGE QUEUING TELEMETRY TRANSPORT (MQTT) PACKET

(71) Applicant: HEWLETT PACKARD ENTERPRISE DEVELOPMENT LP, Houston, TX (US)

(72) Inventors: Tathagata Nandy, Bangalore (IN); Guru Gurram Janardhan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 159 days.

(21) Appl. No.: 15/445,512

(22) Filed: Feb. 28, 2017

(65) Prior Publication Data
US 2018/0248804 A1 Aug. 30, 2018

(51) Int. Cl.
H04L 12/813 (2013.01)
H04L 12/26 (2006.01)
(Continued)

(52) U.S. Cl.
CPC .......... *H04L 47/20* (2013.01); *H04L 41/0893* (2013.01); *H04L 43/08* (2013.01); *H04L 47/805* (2013.01); *H04L 49/35* (2013.01); *H04L 67/1002* (2013.01); *H04L 67/14* (2013.01); *H04L 67/28* (2013.01); *H04L 67/2809* (2013.01); *H04L 67/2819* (2013.01);
(Continued)

(58) Field of Classification Search
None
See application file for complete search history.

(56) References Cited

U.S. PATENT DOCUMENTS

2007/0028001 A1 2/2007 Phillips et al.
2010/0306365 A1* 12/2010 Gale .................. H04L 51/14
709/224
(Continued)

FOREIGN PATENT DOCUMENTS

WO   WO-2010040010   4/2010

OTHER PUBLICATIONS

Banda, G. et al.,; One IOT: an IOT Protocol and Framework for OEMS to Make IOT-enabled Devices Forward Compatible; www.researchgate.net/publication/307533256_One_IoT_an_IoT_protocol_and_framework_for_OEMs_to_make_IoT-enabled_devices_forward_compatible; Aug. 30, 2016; 15 pages.

*Primary Examiner* — Ester B. Henderson
(74) *Attorney, Agent, or Firm* — Hewlett Packard Enterprise Patent Department

(57) ABSTRACT

In some examples, a method includes identifying, by a network switching device, a network packet received via a particular port as a Message Queuing Telemetry Transport (MQTT) packet, wherein the MQTT packet is transmitted between a broker device and a subscriber device; performing, by the network switching device, a deep packet inspection (DPI) to identify a network address corresponding to the broker device; applying, by the network switching device, a network policy defined in a policy engine that is specific to at least one of the broker device and the subscriber device, wherein the at least one of the broker device and the subscriber device is not statically configured in the policy engine; and performing, by the network switching device, a specific action based on the applied network policy.

20 Claims, 6 Drawing Sheets

(51) Int. Cl.
  *H04L 29/06*  (2006.01)
  *H04L 29/08*  (2006.01)
  *H04L 12/931*  (2013.01)
  *H04L 12/927*  (2013.01)
  *H04L 12/24*  (2006.01)

(52) U.S. Cl.
  CPC .......... *H04L 67/2842* (2013.01); *H04L 67/42* (2013.01); *H04L 69/22* (2013.01); *H04L 43/10* (2013.01)

(56) References Cited

U.S. PATENT DOCUMENTS

| | | |
|---|---|---|
| 2016/0156614 A1 | 6/2016 | Jain |
| 2016/0205106 A1 | 7/2016 | Yacoub |
| 2016/0259932 A1 | 9/2016 | Lakshmanan |
| 2016/0301707 A1 | 10/2016 | Cheng |
| 2016/0323283 A1 | 11/2016 | Kang |
| 2017/0104792 A1* | 4/2017 | Sanjeev ............... H04L 65/1069 |
| 2017/0279874 A1* | 9/2017 | Jolfaei ................ H04L 67/1002 |
| 2017/0332421 A1* | 11/2017 | Sternberg ............. H04W 76/11 |
| 2018/0102997 A1* | 4/2018 | Bachmann .............. H04L 51/08 |

* cited by examiner

PERFORMING A SPECIFIC ACTION ON A NETWORK PACKET IDENTIFIED AS A MESSAGE QUEUING TELEMETRY TRANSPORT (MQTT) PACKET

BACKGROUND

Multiple Internet of Things (IoT) protocols currently exist for communications in IoT networks. IoT network generally refers to a network of interconnected things or devices, which are embedded with sensors, software, network connectivity, and electronics that enable them to collect and exchange data. The various IOT devices typically communicate with different types of protocols. One example IoT protocol is the message queuing telemetry transport (MQTT) protocol. The MQTT protocol allows a specific action to be performed on an identified resource. However, currently, network switching devices can neither track the communications between IoT devices nor identify a particular device as an IoT device. Thus, network switching devices cannot perform any special actions to the particular device.

BRIEF DESCRIPTION OF THE DRAWINGS

The following detailed description references the drawings, wherein.

DETAILED DESCRIPTION

To address the challenges mentioned above, the solution herein involves a method to identify IoT devices in the network, and perform specific actions on them. The specific action could be, for example, applying policies or modifying Quality of Service (QoS). Optionally, the network switching device can export the information to a third party device, which can take a specific action on the identified IoT devices.

One example IoT protocol is message queuing telemetry transport (MQTT) protocol. The MQTT protocol generally refers to a publish-subscribe-based lightweight messaging protocol for use on top of the TCP (Transmission Control Protocol)/IP (Internet Protocol). Its publish-subscribe messaging pattern involves a message broker. The broker generally is responsible for distributing messages to interested clients based on the topic of a message. The MQTT protocol can be used to define verbs (also known as "methods") to indicate a specific action to be performed on the identified resource.

In this solution, a network switching device can identify a received network packet as a MQTT packet by performing deep packet inspection. Thus, a device sending the MQTT packet can be identified as an IoT device. Furthermore, the network switching device can identify the role of the IoT device in the MQTT protocol (e.g., a subscriber, a broker, a publisher, etc.). Then, based on the role of the IoT device, the network switching device can communicate with a policy engine to apply a particular policy and/or perform a specific action. Specifically, the network switching device can act as a broker proxy, provide for broker redundancy or load balancing, assign a QoS class to a particular type of traffic, perform analytics on a topic or device, etc.

Architecture

Figure 1:
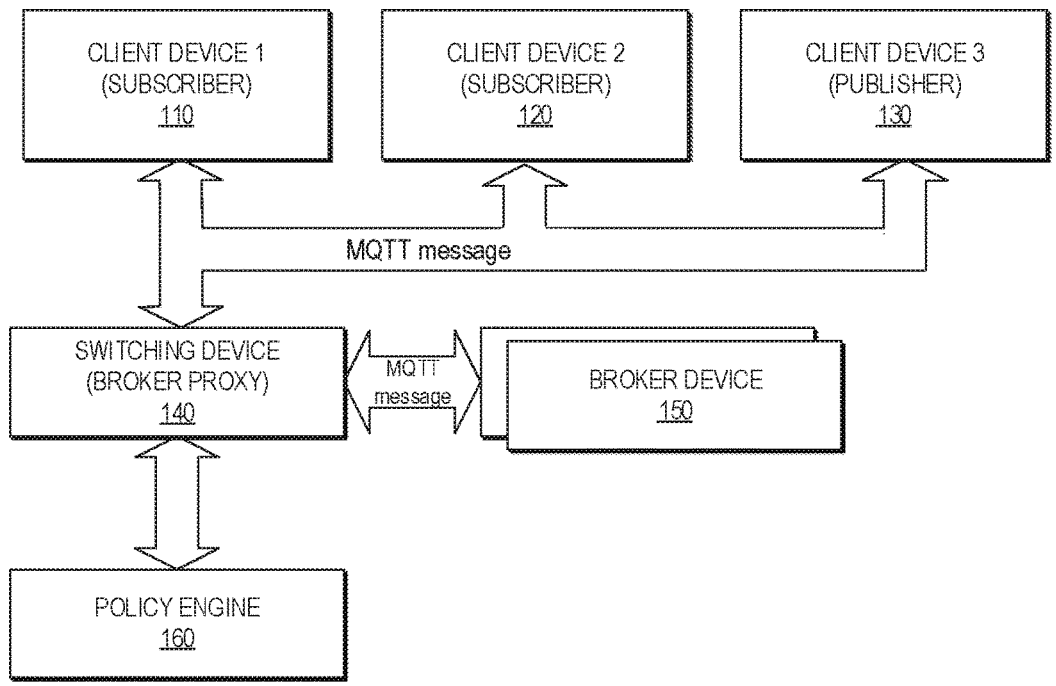
FIG. 1 is a block diagram of an example architecture for performing a specific action on a network packet identified as a MQTT packet.

FIG. 1 is a block diagram of an example architecture for performing a specific action on a network packet identified as a MQTT packet. Specifically, FIG. 1 includes a switching device 140 that is communicatively coupled with a policy engine 160. In addition, FIG. 1 also includes a plurality of IoT devices, such as, client device 1 110, client device 2 120, client device 3 130, and broker device 150.

Switching device 140 generally includes any computer networking device that can connect devices together in a computer network, process and forward data to a destination device. For example, switching device 140 can be a network switch, a wireless controller, a service controller, and so on.

Policy engine 160 may be any network policy manager that provides role- and/or device-based network access control across wired and/or wireless IoT infrastructure. Policy engine 160 may provide flexible policy configuration and enforcement, client device secure provisioning, user/guest authentication, and many other functionalities. Policy engine 160 may reside on any network device, including a network server or controller. In some examples, policy engine 160 may be a component that physically reside on network switching device 140.

Client devices (e.g., client device 1 110, client device 2 120, client device 3 130) generally refers to a computer device that access any service through an IoT network. The plurality of IoT devices may include client devices and server devices. The server devices may act in the role of a broker. Moreover, the client devices may act in different roles, such as, a subscriber or a publisher. The MQTT protocol is discussed in more details in the section below.

MQTT Protocol

The MQTT protocol generally refers to a client-server publish/subscribe messaging transport protocol. Because it is lightweight, open, simple, and easy to implement, it can be used in constrained environments, such as, for communications in Machine-to-Machine (M2M) and Internet of Things (IoT) contexts where a small code footprint is used and/or network bandwidth is at a premium.

A MQTT client can include a publisher or a subscriber. The publisher (e.g., client device 3 130) generally refers to a MQTT client device that publishes a topic, whereas the subscriber (e.g., client device 1 110 and client device 2 120) generally refers to a MQTT client device that subscribes to a topic. Note that, in general, a MQTT client can be both a publisher and a subscriber at the same time. A MQTT client device may be any device, ranging from a micro controller to a full-fledged server, which runs a MQTT library and is connected to an MQTT broker over a network. The easy implementation of the MQTT client makes MQTT suitable for small devices.

A MQTT broker (e.g., broker device 150) generally refers to a centralized entity in the publish/subscribe protocol. Every message transmitted between a subscriber and a publisher will pass through the MQTT broker. Hence, broker device 150 can concurrently communicate with a large number of MQTT client devices and control traffic between the MQTT components. Broker device 150 generally is responsible for receiving messages, filtering messages, determining which client devices are interested in a particular message, and then sending the message to subscribed client devices.

Also, broker device 150 maintains the session of persisted clients, including subscriptions and missed messages. Because there is no direct communications between the subscriber and the publisher under the MQTT protocol, broker device 150 maintains separate sessions with each subscriber device (e.g., client device 1 110 and client device 2 120), as well as with each publisher device (e.g., client device 3 130). Then, broker device connects the session it maintains with the subscriber with the session it maintains with the publisher.

In an example industry IoT network that includes a service provider and many IoT devices. The service provider may be a publisher, and the IoT devices that it serves can be the subscriber using the MQTT protocol.

In some situations, the role of MQTT components can change over time. A client device acting as a subscriber for one topic can be a publisher for another topic. Also, a client device may act as a publisher for a period of time and a subscriber for a different period of time. Therefore, the role of MQTT components (e.g., subscriber, publisher, or broker) cannot be configured in policy engine 160 through static configuration. The solution disclosed herein can be used to identify IoT devices, for example, broker devices in an IoT network that uses the MQTT as its communication protocol, and then apply specific actions on the IoT devices.

IoT Device Identification

In order to identify the IoT devices, switching device 140 can perform a deep packet inspection (DPI) on received network packets. Generally, MQTT packets are TCP packets sent to a specific port, such as, port number 1833. In one example, the client devices can be wireless devices and the network packets can be received via an access point in a wireless local area network (WLAN). Therefore, switching device 140 can intercept packets, which are received from the socket that is bound on port number 1833.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. As used herein, 'wireless local area network' (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

Then, switching device 140 can apply DPI on those packets and determine the destination IP address for those packets. Based on the packet type and the destination IP address, switching device 140 can identify broker device 150. For example, MQTT messages may include various packet types, such as, a Connect message, a Connect-Ack message, a Subscribe message, a Subscribe-Ack message, a Publish message, a Ping-request message, a Ping-response message, etc. These packet types can be identified in the header of an MQTT packet based on the field "Message type."

Note that any MQTT packets that are sent to or from broker device 150 can be captured to identify the address of broker device 150. Specifically, MQTT brokers (e.g., broker device 150) can be identified by at least two ways: First, the broker device 150 can be statically configured in switching device 140. Second, by inspecting the publisher/subscriber messages that are sent to broker device 150 through switching device 140, switching device 140 can figure out broker device 150 by identifying the destination IP address in the publisher/subscriber messages. Table 1 below illustrates an example source code for identifying broker device 150.

TABLE 1

```
union packet_info {
    unsigned char *c;
    struct in_pktinfo *pktInfo;
};
#define PURE_UDP 1
union control _u {
    struct cmsghdr align; /* this ensures alignment */
    char control[CMSG_SPACE(sizeof(struct in_pktinfo))];
};
int main( )
{
  socklen_t clientlen; /* byte size of client's address */
  int n; /* message byte size */
  char buf[1024]={0};
  int sock, optval = 1;
  struct sockaddr_in broker;
  struct cmsghdr *cmptr; /* pointer to ancillary data
structure. */
  struct iovec iov;
  uint32_t ifinput = -1;
  union packet_info pinfo;
  union control_u ctrl;
  struct msghdr msg;
  int ret = 0;
  struct sockaddr_in sa;
  sock = socket(AF_INET, SOCK_RAW, 0);
  if (sock < 0) {
      printf ("\nERROR opening socket %d", errno);
      return 0;
  }
  memset(&broker, 0, sizeof(struct sockaddr_in));
  memset(&sa, 0, sizeof(struct sockaddr_in));
  sa.sin_family = AF_INET;
  sa.sin_port = htons(1833); //For MQTT packets, watch on
port 1833
  printf("Sock fd allocated :: %d \n", sock);
  if (bind (sock, (struct sockaddr *) &sa, sizeof(struct
sockaddr_in)) == -1)
  {
      printf("Bind to Port Number %d
failed\n", SENDER_PORT_NUM);
      close (sock);
      exit(1);
  }
  while (1) {
     bzero(buf, 1024);
     n = recvfrom(sock, buf, 1024, 0,
         (struct sockaddr *) &broker, &clientlen);
     if (n < 0)
        printf("\nERROR in recvfrom %d", errno);
     else
        printf("\nReceived %d bytes from broker %d", n,
broker.sin_addr.s_addr);
  }
  return 0;
}
```

Furthermore, an MQTT broker's status can be identified using probe messages. If MQTT broker device 150 is down, then the TCP sessions between MQTT broker device 150 and other MQTT components (e.g., client devices 1 110 to client device 3 130) would terminate as the destination IP address is no longer valid. With the solution described herein, the traffic downtime can be reduced, because any new request to broker device 150 can be handled by switching device 140 that is acting as a proxy broker. Also, identification of broker device 150 allows specific action to be performed on the broker traffic. For example, the broker traffic may be given a higher priority than other traffic in the MQTT message communications.

Actions on IoT Traffic

Once broker device 150 is identified, switching device 140 can perform various specific actions on the IoT traffic. For example, switching device 140 can block traffic from a client device (e.g., client device 1 110) for a particular topic. In some examples, switching device 140 can completely block traffic from a particular client device. In some examples, switching device 140 can block traffic from a publisher for a particular topic. In some examples, switching device 140 can completely block traffic from a particular publisher. The above examples are given for illustration purposes only. Switching device 140 can allow or block any type of traffic that is specific to any MQTT component, MQTT message type, and/or MQTT topic.

In some examples, the broker traffic could be given higher priority than other types of traffic. Also, various network policies can be applied. In some examples, the network polices could be configured via a command-line interface by a network administrator. In some examples, the network policies could be stored in a policy engine 160 and applied dynamically on the MQTT messages based on the role of the MQTT components.

In addition, cloud-based monitoring can be applied to the MQTT traffic. The client messages could also be captured to find information about the client devices, such as, their physical location. Then, various security and access level polices can be applied based on the location of the publisher and the subscribers.

Broker Proxy

In some examples, switching device 140 can act as a broker proxy. Specifically, switching device 140 can respond to the subscribe messages from an internal and/or external cache on behalf of broker device 150. For example, if broker device 150 is detected to be unavailable in the network, when a client device (e.g., client device 1 110) sends a new subscribe request to broker device 150, switching device 140 can respond to the subscribe request from the client device (subscriber) on behalf of broker device 150. In some examples, switching device 140 can monitor network health metrics associated with broker device 150 by periodically transmitting health monitoring packets to broker device 150 and assessing the network health metrics based on the responses from broker device 150. Once switching device 140 determines that broker device 150 fails to operate in a healthy mode, switching device 140 can start acting as the broker proxy for broker device 150. Thus, the broker proxy may be active even when broker device 150 is available in the network, so long as the network health metrics indicate usage of the broker proxy.

Generally, broker device 150 stores in a cache session information, including the topics that each publisher publishes to the subscribers. By intercepting and analyzing the MQTT packets, switching device 140 can extract the topic information. Moreover, switching device 140 can track sessions that are active in the IoT network and maintained by a particular broker (e.g., broker device 150), as well as the publisher/subscriber information corresponding to those sessions. Switching device 140 will store the MQTT session information that it extracted from the intercepted network packets in a local cache. When broker device 150 is back up in the IoT network, switching device 140 can transfer the active sessions back to broker device 150 for future MQTT session management.

In some examples, when acting as a broker proxy for broker device 150, switching device 140 can receive a publisher message and create a new topic on behalf of broker device 150. Furthermore, switching device 140 can create a new session with the publisher (e.g., client device 3 130) for the new topic. Also, switching device 140 can create new sessions with multiple subscribers (e.g., client device 1 110 and client device 2 120), which subscribe to the new topic. Switching device 140 can maintain the new sessions as a broker proxy until broker device 150 becomes available in the IoT network. Then, switching device 140 can initiate a session transfer process to transfer the newly created sessions for the newly published topic to broker device 150.

In some examples, switching device 140 can provide broker redundancy for broker device 150. Specifically, a broker proxy can be built within switching device 140. The broker proxy can publish a virtual IP address, which will be used as a front-end network address to the actual broker. When switching device 140 receives a MQTT message directed to the virtual IP address, the message can be processed by both the broker proxy at switching device 140 and broker device 150. Therefore, switching device 140 will maintain identical session information as broker device 150. The broker proxy acting as a redundant broker can improve the robustness of the IoT system.

In some examples, switching device 140 can provide broker load balancing for multiple broker devices in the back end. Specifically, a broker proxy can be built within switching device 140. The broker proxy can publish a virtual IP address, which can be shared by multiple back-end broker devices. When switching device 140 receives a MQTT message directed to the virtual IP address, the message can apply a load balancing scheme to determine a particular back-end broker device for processing the received MQTT message. The load balancing scheme can be either a round robin scheme or a hashing scheme based on the combination of source address and destination address in the MQTT message. Further, the source address and destination address can be either an IP address or a Media Access Control (MAC) address. Moreover, broker proxy can ensure that MQTT messages that belong to the same session will be forwarded to the same back-end broker device.

In some examples, switching device 140 can export collected MQTT data to an external entity for data analytics. In some examples, switching device 140 can collaborate with policy engine 160 to apply different policies stored in policy engine 160. Note that the policies can be applied to the broker device, the publisher device, and/or the subscriber device dynamically, even though such device roles cannot be statically configured in policy engine 160. After retrieving an applicable policy from policy engine 160, switching device 140 can dynamically determine the MQTT component (e.g., a device or a device group) to which the policy should be applied.

Figure 2:
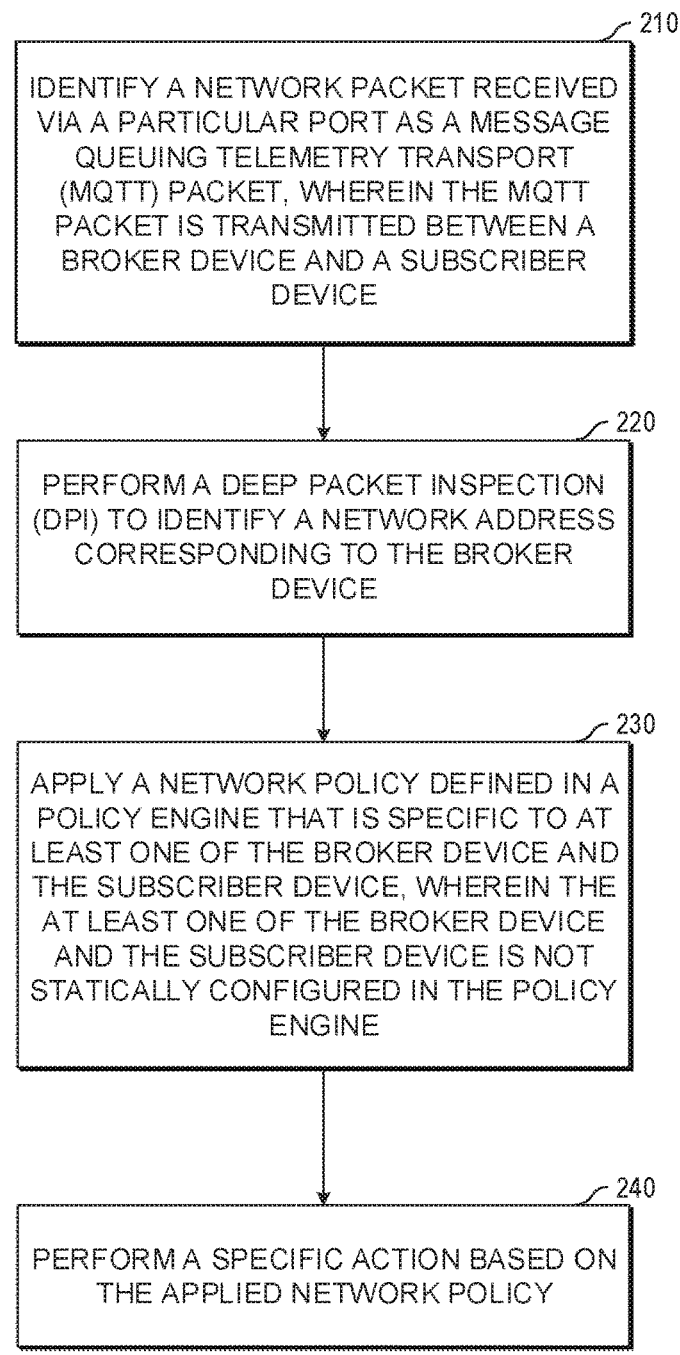
FIG. 2 is a flowchart of an example process of performing a specific action on a network packet identified as a MQTT packet.
Figure 3:
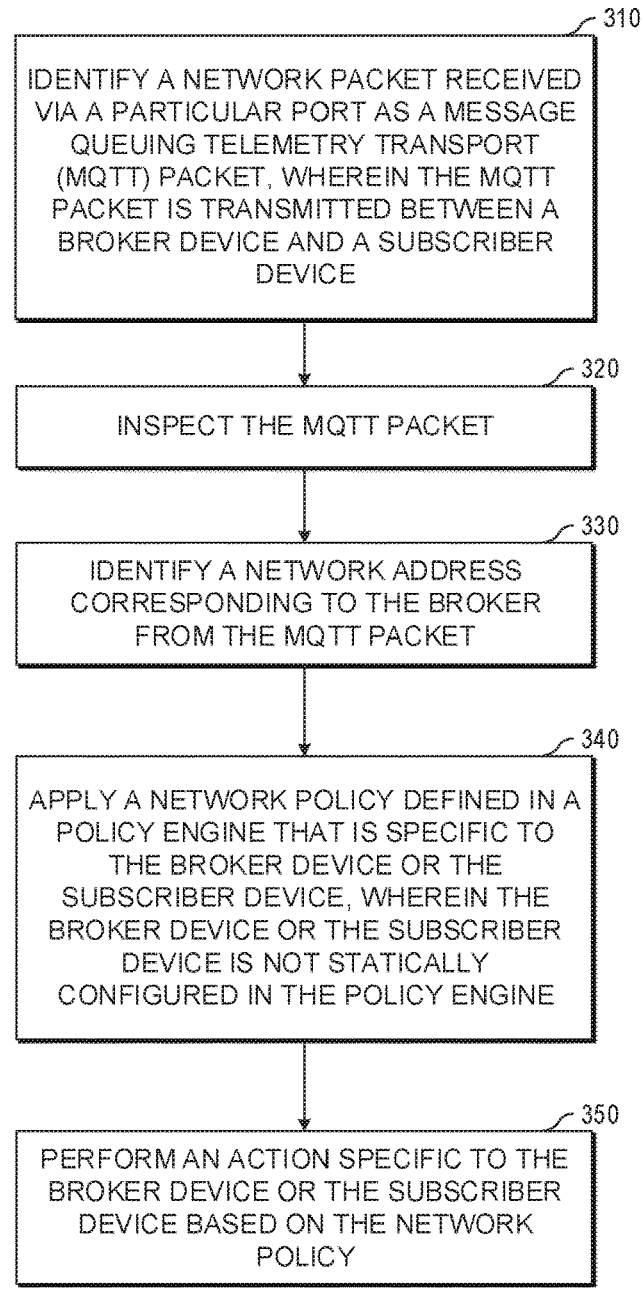
FIG. 3 is a flowchart of an example process of performing a specific action on a network packet identified as a MQTT packet.
Figure 4:
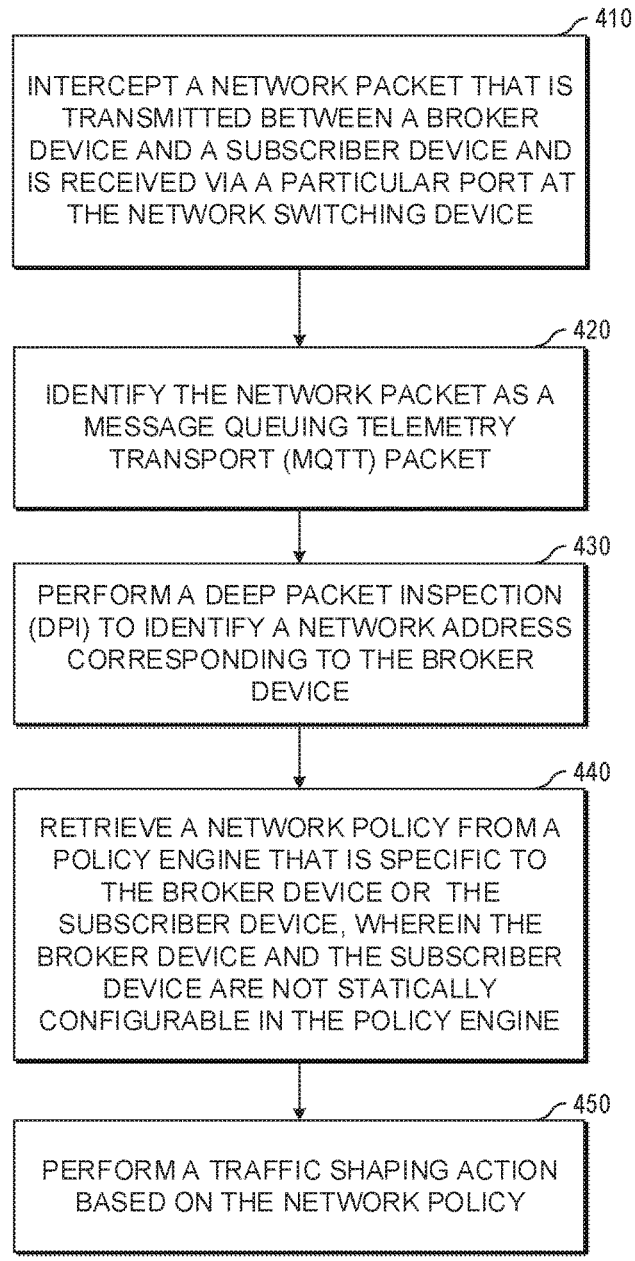
FIG. 4 is a flowchart of an example process of performing a specific action on a network packet identified as a MQTT packet.

Processes to Perform a Specific Action on a Network Packet Identified as a MQTT Packet In discussing FIGS. 2-4, references may be made to the components in FIG. 1 to provide contextual examples. In one implementation, switching device 140 described in FIG. 1 executes operations 210-240, 310-350, and 410-450 to perform a specific action on a network packet identified as a MQTT packet. Further, although FIGS. 2-4 are described as implemented by a network device, it may be executed on other suitable devices or components. For example, FIGS. 2-4 may be implemented in the form of executable instructions on a machine-readable storage medium 520 as in FIG. 5. In addition, the executable instructions may be stored on memory 640 in a network switching device 630 as in FIG. 6.

FIG. 2 is a flowchart of an example process of performing a specific action on a network packet identified as a MQTT packet. First, a network switching device can identify a network packet received via a particular port as a Message Queuing Telemetry Transport (MQTT) packet (operation 210). The MQTT packet may be transmitted between a broker device and a subscriber device. Next, the network switching device can perform a deep packet inspection (DPI) to identify a network address corresponding to the broker device (operation 220). Then, the network switching device can apply a network policy defined in a policy engine that is specific to at least one of the broker device and the subscriber device (operation 230). Here, the broker device and/or the subscriber device cannot be statically configured in the policy engine. Furthermore, the network switching device can perform a specific action based on the applied network policy (operation 240).

FIG. 3 is a flowchart of another example process of performing a specific action on a network packet identified as a MQTT packet. In this example, the network switching device first can identify a network packet received via a particular port as a Message Queuing Telemetry Transport (MQTT) packet (operation 310). The MQTT packet may be transmitted between a broker device and a subscriber device. Next, the network switching device can inspect the MQTT packet (operation 320). Also, the network switching device can identify a network address corresponding to the broker from the MQTT packet (operation 330). In addition, the network switching device can apply a network policy defined in a policy engine that is specific to the broker device or the subscriber device, wherein the broker device or the subscriber device is not statically configured in the policy engine (operation 340). Finally, the network switching device can perform an action specific to the broker device or the subscriber device based on the network policy (operation 350).

FIG. 4 is a flowchart of yet another example process of performing a specific action on a network packet identified as a MQTT packet. Here, the network switching device first can intercept a network packet that is transmitted between a broker device and a subscriber device and is received via a particular port at the network switching device (operation 410). Then, the network switching device can identify the network packet as a Message Queuing Telemetry Transport (MQTT) packet (operation 420). Further, the network switching device can perform a deep packet inspection (DPI) to identify a network address corresponding to the broker device (operation 430). Also, the network switching device can retrieve a network policy from a policy engine that is specific to the broker device or the subscriber device (operation 440). Note that the broker device and the subscriber device are not statically configurable in the policy engine. Moreover, the network switching device can perform a traffic shaping action based on the network policy.

In some examples, the broker device can receive a plurality of topics published by a publisher device. Then, the broker device can service the plurality of topics to a plurality of subscriber devices. Note that the broker device, the publisher device, and the subscriber device act in their respective roles dynamically for each topic.

In some examples, the network switching device can further capture MQTT packets that are transmitted to and from the broker device. Then, the switching device can give a high priority to the MQTT packets that are transmitted to and from the broker device. In some examples, the switching device can capture client messages that are transmitted to and from the subscriber device. Then, the switching device can extract information, which may include a location of the subscriber device from the captured client messages.

In some examples, the switching device can further create a broker proxy that caches actives sessions maintained by the broker device. In addition, the switching device can directly respond a message from the subscriber device in one of the active sessions without communicating the message to the broker device.

In some examples, the broker proxy can further monitor activities of the broker device and replace the broker device in response to the activities indicating that the broker device is unavailable. The broker proxy and the broker device may share a single virtual Internet Protocol (IP) address to allow the broker proxy provide broker redundancy for the broker device. Also, the broker proxy may use a single virtual Internet Protocol (IP) address to communicate with the subscriber device. On the other hand, the broker proxy may communicate with a plurality of broker devices to perform load balancing across the plurality of broker devices.

In some examples, performing the specific action based on the applied network policy may involve blocking traffic from a client device for a selected topic; blocking traffic from a publisher device for the selected topic; changing a Quality of Service (QoS) class for a plurality of subscriber devices that are subscribed to the selected topic; blocking traffic from the broker device that belongs to a particular broker group; etc.

The broker proxy can be used as a backup broker device corresponding to the broker device, a redundant broker device corresponding to the broker device, or a gateway broker device that performs load balances across multiple broker devices. The network switching device herein may be a network switch, a wireless controller, a service controller, etc.

Figure 5:
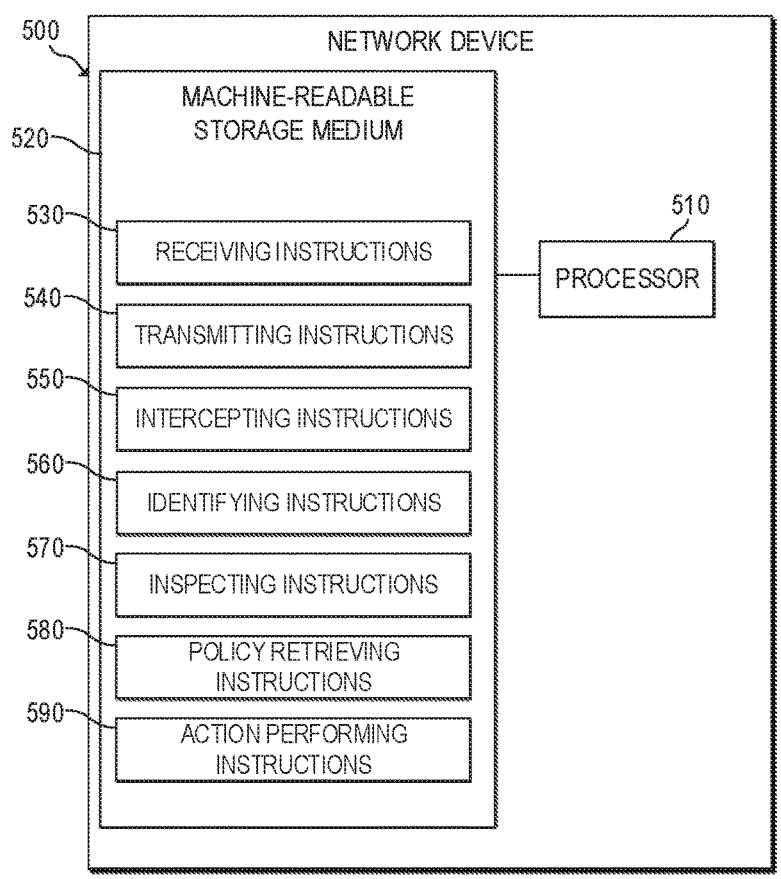
FIG. 5 is a block diagram of an example network device to perform a specific action on a network packet identified as a MQTT packet.

Network Device to Perform a Specific Action on a Network Packet Identified as a MQTT Packet FIG. 5 is a block diagram of an example network device with at least one processor 510 to execute instructions 530-590 within a machine-readable storage medium and/or memory 520 to perform a specific action on a network packet identified as a MQTT packet. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

Although the network device 500 includes at least one processor 510 and machine-readable storage medium 520, it may also include other components that would be suitable to one skilled in the art. For example, network device 500 may include an additional processing component and/or storage. In another implementation, the network device executes instructions 530-590. Network device 500 is an electronic device with the at least one processor 510 capable of executing instructions 530-590, and as such implementations of network device 500 include a mobile device, server, data center, networking device, client device, computer, IoT device, or other type of electronic device capable of executing instructions 530-590. The instructions 530-590 may be implemented as methods, functions, operations, and other processes implemented as machine-readable instructions stored on the storage medium 520, which may be non-transitory, such as hardware storage devices (e.g., random access memory (RAM), read only memory (ROM), erasable programmable ROM, electrically erasable ROM, hard drives, and flash memory). The machine-readable storage medium and/or memory 520 includes instructions 530-590 for the processor 510 to fetch, decode, and execute.

Figure 6:
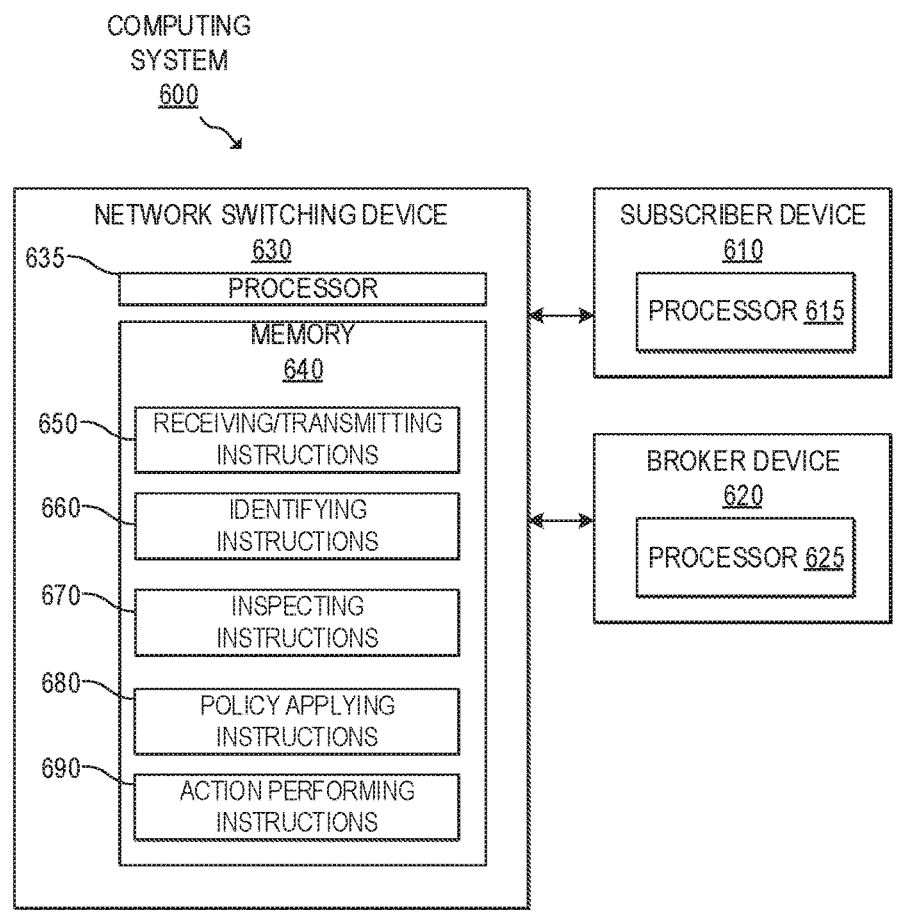
FIG. 6 is a block diagram of an example network device to perform a specific action on a network packet identified as a MQTT packet.

FIG. 6 is a block diagram of an example computing system 600 that includes a subscriber device 610, a broker device 620, and a network switching device 630 to perform a specific action on a network packet identified as a MQTT packet. Subscriber device 610 may include a processor 615. Broker device 620 may include a processor 625. Likewise, network switching device 630 may include a processor 635 and a memory 640. Memory 640 may be an electronic, magnetic, or optical memory, storage, flash-drive, or other physical device that contains or stores executable instructions 650-690. Thus, memory 640 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the memory 640 may include an application and/or firmware which can be utilized independently and/or in conjunction with the at least one processor 610 to fetch, decode, and/or execute instructions of memory 640. The application and/or firmware may be stored on memory 640 and/or stored on another location of the computing system 600.

Instructions 530-590 (or 650-690) may be executed by processor 510 (or processor 635) to perform a specific action on a network packet identified as a MQTT packet. Specifically, the at least one processor 510 (or processor 635) can execute instructions 530-590 (or instructions 650-690) to: intercept a network packet that is transmitted between a broker device and a subscriber device and is received via a particular port at the network switching device; identify a network packet received via a particular port as a Message Queuing Telemetry Transport (MQTT) packet, wherein the MQTT packet is transmitted between a broker device and a subscriber device; inspect the MQTT packet; identify a network address corresponding to the broker from the MQTT packet; perform a deep packet inspection (DPI) to identify a network address corresponding to the broker device; apply a network policy defined in a policy engine that is specific to at least one of the broker device and the subscriber device, wherein the at least one of the broker device and the subscriber device is not statically configured in the policy engine; etc.

Moreover, the at least one processor 510 (or processor 635) can further execute instructions 530-590 (or instructions 650-690) to: retrieve a network policy from a policy engine that is specific to the broker device or the subscriber device, wherein the broker device and the subscriber device are not statically configurable in the policy engine; perform a traffic shaping action based on the network policy; perform a specific action based on the applied network policy; perform an action specific to the broker device or the subscriber device based on the network policy; capture MQTT packets that are transmitted to and from the broker device; give a high priority to the MQTT packets that are transmitted to and from the broker device; capture client messages that are transmitted to and from the subscriber device; extract information comprising a location of the subscriber device from the captured client messages; create a broker proxy that caches actives sessions maintained by the broker device; directly respond a message from the subscriber device in one of the active sessions without communicating the message to the broker device; use a single virtual Internet Protocol (IP) address to communicate with the subscriber device, and wherein the broker proxy communicates with a plurality of broker devices; perform load balancing across the plurality of broker devices; block traffic from a client device for a selected topic; block traffic from a publisher device for the selected topic; change a Quality of Service (QoS) class for a plurality of subscriber devices that are subscribed to the selected topic; block traffic from the broker device that belongs to a particular broker group; monitor activities of the broker device; replace the broker device in response to the activities indicating that the broker device is unavailable; share a single virtual Internet Protocol (IP) address with the broker device to allow the network switching device provide broker redundancy for the broker device; etc.

We claim:

1. A method comprising:

identifying, by a network switching device, a network packet received via a particular port as a Message Queuing Telemetry Transport (MQTT) packet, wherein the MQTT packet is transmitted between a broker device and a subscriber device;

performing, by the network switching device, a deep packet inspection (DPI) to identify a network address corresponding to the broker device;

determining, by the network switching device, that network traffic between the broker device and the subscriber device is of an Internet-of-Things (IoT) type network traffic;

applying, by the network switching device, a network policy defined in a policy engine that is specific to at least one of the broker device and the subscriber device, wherein the at least one of the broker device and the subscriber device is not statically configured in the policy engine; and performing, by the network switching device, a specific action on the IoT type network traffic between the broker device and the subscriber device based on the applied network policy.

2. The method of claim 1, wherein the broker device receives a plurality of topics published by a publisher device and services the plurality of topics to a plurality of subscriber devices, and wherein the broker device, the publisher device, and the subscriber device act in their respective roles dynamically for each topic.

3. The method of claim 1, further comprising:

capturing, by the network switching device, MQTT packets that are transmitted to and from the broker device; and giving, by the network switching device, a high priority to the MQTT packets that are transmitted to and from the broker device.

4. The method of claim 1, further comprising:

capturing, by the network switching device, client messages that are transmitted to and from the subscriber device; and extracting, by the network switching device, information comprising a location of the subscriber device from the captured client messages.

5. The method of claim 1, further comprising:

creating, on the network switching device, a broker proxy that caches actives sessions maintained by the broker device; and directly responding, by the network switching device, a message from the subscriber device in one of the active sessions without communicating the message to the broker device.

6. The method of claim 1, wherein the broker proxy further monitors activities of the broker device and replaces the broker device in response to the activities indicating that the broker device is unavailable.

7. The method of claim 6, wherein the broker proxy and the broker device share a single virtual Internet Protocol (IP) address to allow the broker proxy provide broker redundancy for the broker device.

8. The method of claim 6, wherein the broker proxy uses a single virtual Internet Protocol (IP) address to communicate with the subscriber device, and wherein the broker proxy communicates with a plurality of broker devices to perform load balancing across the plurality of broker devices.

9. The method of claim 1, wherein performing the specific action based on the applied network policy comprises one of: blocking traffic from a client device for a selected topic; blocking traffic from a publisher device for the selected topic; changing a Quality of Service (QoS) class for a plurality of subscriber devices that are subscribed to the selected topic; and blocking traffic from the broker device that belongs to a particular broker group.

10. The method of claim 1, wherein the network switching device comprises one of a network switch, a wireless controller, and a service controller.

11. A system comprising at least:
a subscriber device comprising a first hardware processor;
a broker device comprising a second hardware processor; and
a network switching device comprising a third hardware processor that performs operations comprising;
identifying a network packet received via a particular port as a Message Queuing Telemetry Transport (MQTT) packet, wherein the MQTT packet is transmitted between the broker device and the subscriber device; inspecting the MQTT packet;
identifying a network address corresponding to the broker from the MQTT packet; determining that network traffic between the broker device and the subscriber device is of an Internet-of-Things (IoT) type network traffic;
applying a network policy defined in a policy engine that is specific to the broker device or the subscriber device, wherein the broker device or the subscriber device is not statically configured in the policy engine, and
performing an action on the IoT type traffic between the broker device or the subscriber device based on the network policy.

12. The system of claim 11, wherein the operations performed by the third hardware processor further comprise:
creating a broker proxy that caches actives sessions maintained by the broker device; and
directly responding a message received from the subscriber device in one of the active sessions without communicating the message to the broker device by the broker proxy.

13. The system of claim 11, wherein the operations performed by the third hardware processor further comprise:
monitoring activities of the broker device; and
replacing the broker device in response to the activities indicating that the broker device is unavailable.

14. The system of claim 11, wherein the operations performed by the third hardware processor further comprise:
sharing a single virtual Internet Protocol (IP) address with the broker device to allow the network switching device provide broker redundancy for the broker device.

15. The system of claim 11, wherein the operations performed by the third hardware processor further comprise:
using a single virtual Internet Protocol (IP) address to communicate with the subscriber device; and
performing load balancing across the plurality of broker devices.

16. The system of claim 11, wherein the operations performed by the third hardware processor further comprise:
blocking traffic from a client device for a selected topic;
blocking traffic from a publisher device for the selected topic;
changing a Quality of Service (QoS) class for a plurality of subscriber devices that are subscribed to the selected topic; and
blocking traffic from the broker device that belongs to a particular broker group.

17. A non-transitory machine-readable storage medium encoded with instructions executable by at least one processor of a network switching device, the machine-readable storage medium comprising instructions to:
intercept a network packet that is transmitted between a broker device and a subscriber device and is received via a particular port at the network switching device;
identify the network packet as a Message Queuing Telemetry Transport (MQTT) packet;
perform a deep packet inspection (DPI) to identify a network address corresponding to the broker device;
determine that network traffic between the broker device and the subscriber device is of an Internet-of-Things (IoT) type network traffic;
retrieve a network policy from a policy engine that is specific to the broker device or the subscriber device, wherein the broker device and the subscriber device are not statically configurable in the policy engine; and
perform a traffic shaping action on the IoT type network traffic between the broker device and the subscriber device based on the network policy.

18. The non-transitory machine-readable storage medium of claim 17, wherein the traffic shaping action comprises:
blocking traffic from a client device for a selected topic;
blocking traffic from a publisher device for the selected topic;
changing a Quality of Service (QoS) class for a plurality of subscriber devices that are subscribed to the selected topic; and
blocking traffic from the broker device that belongs to a particular broker group.

19. The non-transitory machine-readable storage medium of claim 17, wherein the machine-readable storage medium further comprising instructions to:
create a broker proxy that caches actives sessions maintained by the broker device; and
respond to the subscriber device in one of the active sessions cached by the broker proxy without communicating the message to the broker device.

20. The non-transitory machine-readable storage medium of claim 17, wherein the broker proxy is used as one of a backup broker device corresponding to the broker device, a redundant broker device corresponding to the broker device, a gateway broker device that performs load balances across multiple broker devices comprising the broker device.

* * * * *